United States Patent
Mironets et al.

(10) Patent No.: US 10,730,281 B2
(45) Date of Patent: Aug. 4, 2020

(54) METHOD FOR ADDITIVELY MANUFACTURING COMPONENTS

(71) Applicant: Hamilton Sundstrand Corporation, Charlotte, NC (US)

(72) Inventors: Sergey Mironets, Charlotte, NC (US); William Louis Wentland, Rockford, IL (US); Diana Giulietti, Weatogue, CT (US); Colette Opsahl Fennessy, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 225 days.

(21) Appl. No.: 15/631,814

(22) Filed: Jun. 23, 2017

(65) Prior Publication Data
US 2018/0370215 A1    Dec. 27, 2018

(51) Int. Cl.
*B23K 26/00*  (2014.01)
*B33Y 50/02*  (2015.01)
(Continued)

(52) U.S. Cl.
CPC ............ *B33Y 50/02* (2014.12); *B22F 3/1055* (2013.01); *B22F 5/009* (2013.01); *B23K 26/50* (2015.10);
(Continued)

(58) Field of Classification Search
None
See application file for complete search history.

(56) References Cited

U.S. PATENT DOCUMENTS

| 9,352,421 B2 | 5/2016 | Illston |
| 9,522,426 B2 | 12/2016 | Das et al. |

(Continued)

FOREIGN PATENT DOCUMENTS

| EP | 2865465 | 4/2015 |
| EP | 3173499 A1 | 5/2017 |

(Continued)

OTHER PUBLICATIONS

European Search Report for European Patent Application No. 18179508.9 dated Nov. 22, 2018.

(Continued)

*Primary Examiner* — Mohammad Ali
*Assistant Examiner* — Vincent W Chang
(74) *Attorney, Agent, or Firm* — Carlson, Gaskey & Olds, P.C.

(57) ABSTRACT

An example method of making a component includes providing a digital model of a component to a software program, the software program operable to slice the digital model into digital layers and raster each digital layer into digital segments, the digital segments delineated by digital raster lines. The method further includes depositing a first layer of powdered material onto a platform, compacting the first layer of powered material into a first compacted layer, sintering the first compacted layer along lines corresponding to the digital raster lines using a laser, wherein the laser operates at a first power and a first scan speed, and sintering the first compacted layer along a perimeter of the first compacted layer using the laser to form a first unitary layer, wherein the laser operates at a second power and a second scan speed, wherein the ratio of the first power to the second power is less than about 3. An apparatus for making a component is also disclosed.

20 Claims, 2 Drawing Sheets

(51) Int. Cl.
*B33Y 10/00* (2015.01)
*B22F 5/00* (2006.01)
*B33Y 80/00* (2015.01)
*B33Y 30/00* (2015.01)
*B33Y 50/00* (2015.01)
*B22F 3/105* (2006.01)
*B23K 26/50* (2014.01)

(52) U.S. Cl.
CPC ............... *B33Y 10/00* (2014.12); *B33Y 30/00* (2014.12); *B33Y 50/00* (2014.12); *B33Y 80/00* (2014.12); *B22F 2003/1056* (2013.01); *B22F 2998/10* (2013.01)

(56) References Cited

U.S. PATENT DOCUMENTS

| | | | |
|---|---|---|---|
| 9,555,612 B2 | 1/2017 | Kottilingam et al. | |
| 2010/0190024 A1* | 7/2010 | Edwards, Jr. | B22F 3/16 428/546 |
| 2015/0284832 A1* | 10/2015 | Goller | B21J 1/06 416/244 A |
| 2015/0367577 A1* | 12/2015 | Coeck | 700/119 |
| 2015/0368762 A1* | 12/2015 | Liang | C22C 27/025 423/658.2 |
| 2016/0151860 A1 | 6/2016 | Engeli et al. | |
| 2016/0175986 A1 | 6/2016 | Etter et al. | |
| 2016/0344948 A1 | 11/2016 | Bamberg et al. | |
| 2016/0348216 A1 | 12/2016 | Szuromi et al. | |
| 2017/0021455 A1* | 1/2017 | Dallarosa | B33Y 10/00 |
| 2018/0298816 A1* | 10/2018 | Conde | F02C 7/08 |
| 2018/0326491 A1* | 11/2018 | Koike | B22F 3/1055 |

FOREIGN PATENT DOCUMENTS

| | | |
|---|---|---|
| EP | 3417963 A1 | 12/2018 |
| WO | 2014074947 | 5/2014 |
| WO | 2014176536 A1 | 10/2014 |
| WO | 2014179679 A1 | 11/2014 |
| WO | 2016198885 A1 | 12/2016 |
| WO | 2016201309 | 12/2016 |

OTHER PUBLICATIONS

European Search Report for European Patent Application No. 18200980.3, dated Apr. 18, 2019.

* cited by examiner

METHOD FOR ADDITIVELY MANUFACTURING COMPONENTS

BACKGROUND

This disclosure relates to a method of additively manufacturing components, and more particularly, to additively manufacturing components with high fatigue and creep resistance strength requirements.

Certain components of gas turbine engines are operating at high temperatures and pressures and require high fatigue and creep resistance. To a large extent the microstructure of the material from which the component is formed controls the characteristics of the component. Often, however, there are process constraints and variables that may adversely influence the microstructure-properties relationship, especially in multi-phase, highly alloyed materials.

SUMMARY

A method of making a component according to an example of the present disclosure includes providing a digital model of a component to a software program, the software program operable to slice the digital model into digital layers and raster each digital layer into digital segments, the digital segments delineated by digital raster lines. The method further includes depositing a first layer of powdered material onto a platform, compacting the first layer of powered material into a first compacted layer, sintering the first compacted layer along lines corresponding to the digital raster lines using a laser, wherein the laser operates at a first power and a first scan speed, and sintering the first compacted layer along a perimeter of the first compacted layer using the laser to form a first unitary layer, wherein the laser operates at a second power and a second scan speed, wherein the ratio of the first power to the second power is less than about 3.

In a further embodiment of the foregoing embodiment, the first power is between about 200 and 230 W.

In a further embodiment of any of the foregoing embodiments, the second power is between about 75 and 105 W.

In a further embodiment of any of the foregoing embodiments, the first layer of powdered material has a first thickness after the depositing step. The compacting step compacts the first layer of powdered material to a second thickness that is by between about 40% and 60% of the first thickness.

In a further embodiment of any of the foregoing embodiments, the second thickness is between about 20 and 40 µm (0.79 and 1.57 mil).

In a further embodiment of any of the foregoing embodiments, the compaction step results in a packed density of the first layer of powdered material of between about 4 and 6 g/cc.

In a further embodiment of any of the foregoing embodiments, a distance between the raster lines is between about 30 µm and 100 µm (1.18 and 3.94 mils).

In a further embodiment of any of the foregoing embodiments, the laser has a beam, and a center point of the beam is offset from an edge of the first unitary layer during the second sintering step such that the beam does not overhang the edge of the first unitary layer.

In a further embodiment of any of the foregoing embodiments, the offset includes an outline offset of between about −150 and +150 µm (−5.91 to +5.91 mils) and a Heart offset of between about −150 and +150 µm (−5.91 to +5.91 mils).

In a further embodiment of any of the foregoing embodiments, a controller is operable to receive signals from the software program and direct the laser during the first and second sintering steps.

A further embodiment of the any of the foregoing embodiments includes heat treating the first unitary layer and second unitary layer. The heat treatment is performed in a hot isostatic press.

In a further embodiment of any of the foregoing embodiments, the first unitary layer has an average grain size of between about 40 and 60 µm (1.57 and 2.36 mils) after the heat treatment.

In a further embodiment of any of the foregoing embodiments, the first unitary layer has generally equiaxed grain shapes.

In a further embodiment of any of the foregoing embodiments, the first unitary layer has an average density of greater than about 99% after the heat treatment.

A further embodiment of the any of the foregoing embodiments includes depositing a second layer of powdered material onto the first unitary layer, compacting the second layer of powered material into a second compacted layer, sintering the second compacted layer along lines corresponding to the digital raster lines using a laser, wherein the laser operates at the first power and the first scan speed, and sintering the second compacted layer along a perimeter of the second compacted layer using the laser to form a second unitary layer, wherein the laser operates at the second power and the second scan speed.

In a further embodiment of any of the foregoing embodiments, the second layer of powdered material has a first t thickness after the depositing step. The compacting step compacts the second layer of powdered material to a second thickness, and the second thickness is between about 20 and 40 µm (0.79 and 1.57 mil).

In a further embodiment of any of the foregoing embodiments, the thickness of the second compacted layer is between about 40 and 60% of the thickness of the first compacted layer.

In a further embodiment of any of the foregoing embodiments, the laser has a beam, and a center point of the beam is offset from an edge of the second unitary layer during the fourth sintering step such that the beam does not overhang the edge of the second unitary layer.

In a further embodiment of any of the foregoing embodiments, the material is a powered nickel alloy, and wherein the component is a heat exchanger is operable at temperatures greater than 1600° F. (871° C.).

An apparatus for making a component according to an example of the present disclosure includes a controller operable to receive signals from a software program. The software program is operable to slice a digital model of a component into digital layers and raster each digital layer into digital segments. The digital segments are delineated by digital raster lines, a material source operable to provide material to a platform, a compactor operable to compact the material, and a laser operable to sinter the material. The laser is movable by the controller to sinter the material along the raster lines at a first power and a first speed and along a perimeter of the component at a second power and a second scan speed. The ratio of the first power to the second power is less than about 3.

DETAILED DESCRIPTION

Figure 1B:
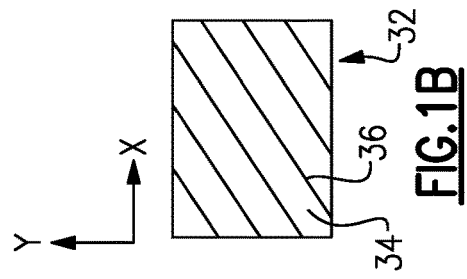
FIG. 1B schematically illustrates a layer of the example gas turbine engine component, a top-down view.
Figure 1A:
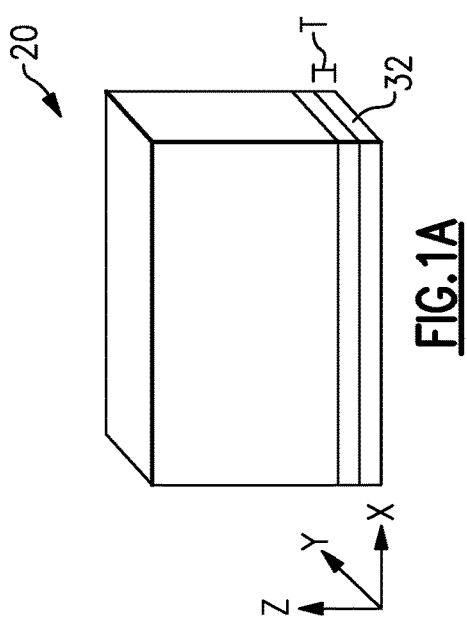
FIG. 1A schematically illustrates an example gas turbine engine component.

FIGS. 1A-B show a schematic view of an example gas turbine engine component 20. In the example of FIGS. 1A-B, the component 20 is a heat exchanger. More particularly, the component 20 is a heat exchanger operable at temperatures greater than 1600° F. (871° C.) without failure of the heat exchanger. As will be appreciated, this disclosure is not limited to heat exchangers and the examples herein apply to other components. The component 20 is formed from a nickel-based alloy with composition shown in Table 1 below. More particularly, the nickel-based alloy is Haynes® 282® (Haynes International) powder.

TABLE 1

|  | Weight % |
| --- | --- |
| Chromium | 20 |
| Cobalt | 10 |
| Molybdenum | 8.5 |
| Titanium | 2.1 |
| Aluminum | 1.5 |
| Iron | 1.5 max |
| Manganese | 0.3 max |
| Silicon | 0.15 max |
| Carbon | 0.06 |
| Boron | 0.005 |
| Nickel | Balance |

Though the component 20 is shown with an example geometry, the component 20 can have any shape, including areas of non-uniform thicknesses. Heat exchangers in particular often include thick areas (such as manifolds) and thinner areas (such as fins), which may be solid or hollow, or include internal features such as cooling passages.

The component 20 is formed by an additive manufacturing process, such as a powder-bed fusion process. More particularly, the component 20 is formed by a laser selective melting process. The component 20 is subjected to a heat treatment after being additively manufactured, which will be discussed in more detail below.

Figure 2:
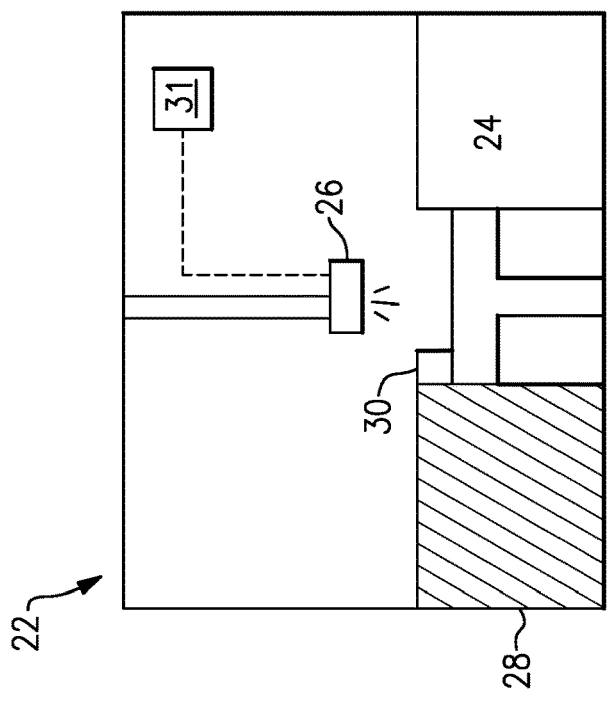
FIG. 2 schematically illustrates an additive manufacturing system.

FIG. 2 shows an example additive manufacturing system 22. The system 22 includes a platform 24, a laser 26, a powder reservoir 28, a compaction-style recoater 30 (such as a rolling recoater system), and a controller 31 operable to direct movement of the laser beam 26. The controller 31 includes necessary software and/or hardware to perform the functions disclosed herein. In general, material (such as powdered nickel-based alloy, discussed above) from the material source 28 is deposited onto the platform 24. The material is then compacted with the compaction-style recoater 30. The controller 31 receives signals from a software program to direct the laser 26 to selectively melt portions of the compacted material according to a sliced file derived from a CAD model's component geometry in the software program to form the component 20.

Figure 3A:
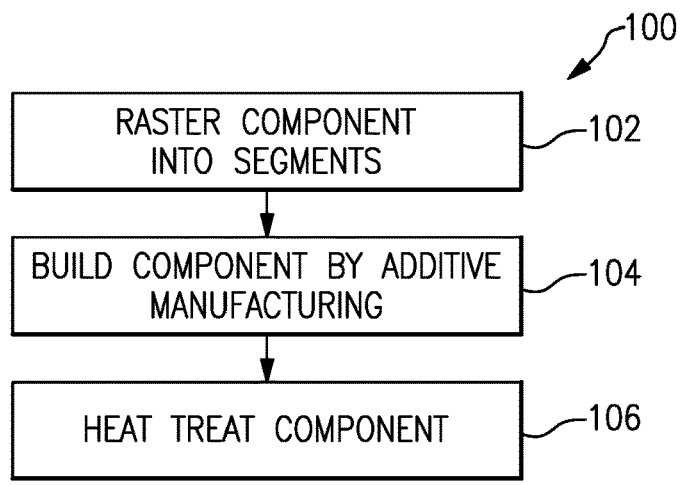
FIG. 3A schematically illustrates a method of additively manufacturing the component.

FIG. 3A schematically shows a method 100 of additively manufacturing the component 20 with the additive manufacturing system 22. A digital model, such as a computer-aided design file, of the desired shape of the component 20 is provided to a software program for rastering (step 102). During rastering, the software program creates digital "slices" or layers of the component shape in the z-direction. In FIGS. 1A-B, layers 32 are shown on the physical component 20 corresponding to the digital model. Each digital layer has a thickness T, which ranges between about 10 and 80 µm (0.39 to 3.15 mils) on corresponding component 20. The software program also divides the digital layer into segments in the x-y plane delineated by raster lines. Segments 34 and raster lines 36 are shown in FIG. 1B on the physical component 20 corresponding to the digital model. A distance H between raster lines known as a hatch distance, and is shown on the physical component 20 corresponding to the digital model in FIG. 1B. In one example, the distance H is between about 30 µm and 100 µm (1.18 and 3.94 mils). In a particular example, the distance H is between about 40 µm and 60 µm (1.57 and 2.36 mils).

In a further example, rastering (step 102) also includes segmenting each layer 32 into "tiles" which can have any shape (square, hexagonal, etc.). This strategy is generally used for larger parts to prevent component warping due to the high density of residual stresses and thermal lensing during the additive manufacturing process.

Referring back to FIG. 3A, in step 104 the component is formed or built by additive manufacturing. The building process 200 is shown in more detail in FIG. 3B and discussed below. In step 106, a heat treatment is performed, which will also be discussed below.

Figure 3B:
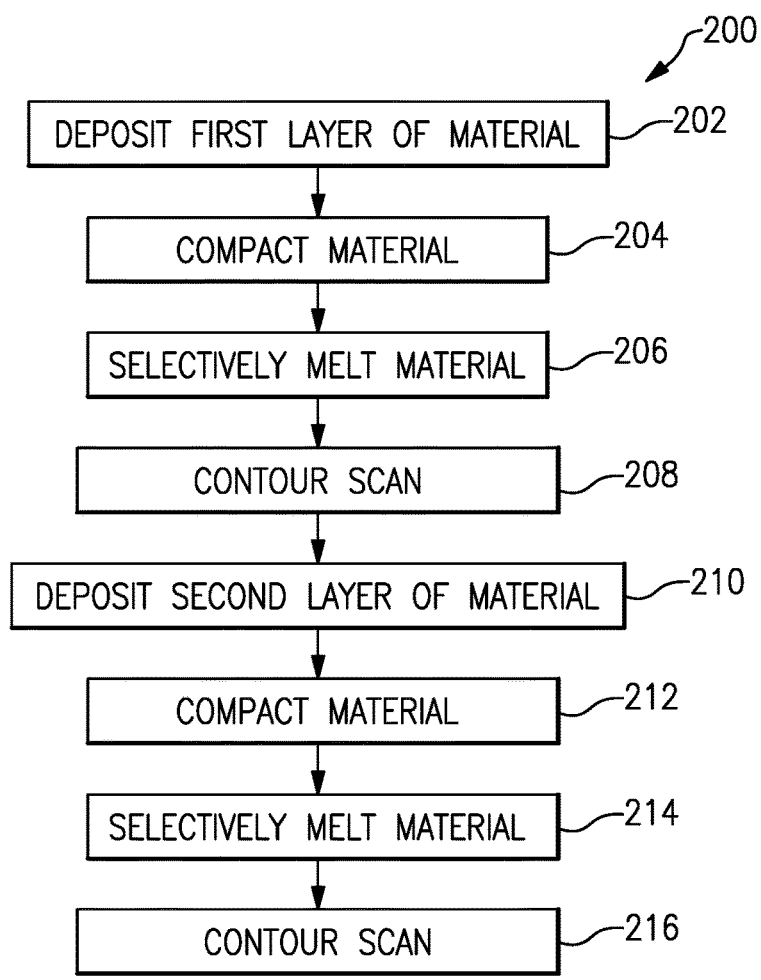
FIG. 3B schematically illustrates a building process of the method of additively manufacturing the component.

Referring now to the building process 200 shown in FIG. 3B, in step 202, a first layer 32A of powdered material, such as the nickel-based alloy described above, is deposited onto the platform 24 from the material source 28 (FIG. 2). In step 204, the first layer 32A is compacted with the compaction-style recoater 30. The compaction step 204 compacts the first layer 32A by between 0 and 50% of the thickness T1 to form a layer 32A having thickness T1'. In a particular example, the compaction step 204 compacts the first layer 32 by between about 20 and 40%. The compaction step results in a packed density of the powdered material of between about 4 and 6 g/cc. More particularly, the packed density is between about 4.8 and 5.3 g/cc. This first layer 32A, also known as the "initial down," has a thickness T1' of between about 40 and 100 µm (1.57 and 3.94 mils) after compaction in step 204. In one particular example, the thickness T1' is between about 50 and 70 µm (1.97 and 2.76 mil) after compaction in step 204.

Figure 4:
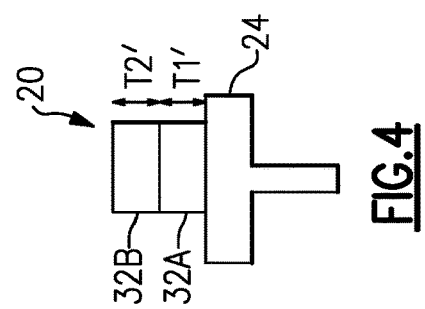
FIG. 4 schematically illustrates a component being additively manufactured on a platform.

In step 206, the software program directs the laser 26 along the digital raster lines 36 to sinter (or melt) the powdered material into a unitary solid layer 32A, shown in FIG. 4. In one example, if the layer 32A is further rastered into "tiles," the laser 26 is directed along the all the raster lines 36 of a single tile before moving on to another tile and repeating the process. In other examples, the laser 26 is directed along various paths, depending on the scan strategy. Scan strategies can be comprised of one or more scan styles to fill in the bulk of the layer 32A. The example scan strategy described herein is known as "heart fill." The software program directs the laser 26 via the controller 31. The software program describes the laser 26 inputs that control the energy provided to a specific quantifiable area, which is the area of the projection of a laser beam 126 onto the component 20 (shown in FIG. 5). These inputs include the power output of the laser 26, and the speed of the laser 26 traversing over the build plan (or the "scan speed"). The scan speed and power are dependent on the machine capability. In one example, the laser 26 operates at a range between 0 and 1000 W over the area of the projection of a laser beam 126 onto the component 20. In a particular example, the laser 26 operates at power range of between about 200 and 230 W area of the projection of the laser beam 126 onto the component 20. In one example, the laser 26 operates at a scan speed of between about 2000 and 2500 mm/second (78.74 and 98.43 in/second). In a particular example, the laser 26 operates at a scan speed of between about 2250 and 2350 mm/second (88.58 and 92.52 in/second). The focused laser beam 126 diameter can range from 50 to 80 microns, with a center point C. If the hatch distance H (discussed above) is too large, the component 20 will have voids in between the raster lines 36 because there will be areas in between the raster lines 36 that are not sintered properly. If it is too small, the sintering step can take multiple passes over the same material and cause overheating and/or distortion. The hatch distance H is thus related to the size of the laser beam (discussed in more detail below) and is selected to minimize both voids and overheating/distortion in the final component 20. Generally hatch distance H is selected to provide a small amount of overlap between successive passes of the laser 26. Step 206 is sometimes known as a "hex scan."

In step 208, the laser 26 is directed by the software program via the controller 31 along the perimeter of the layer 32A to in a subsequent scan strategy, known as a "contour scan," to solidify the perimeter of the layer 32A. In one example, the laser 26 operates at a power range between 0 and 1000 W over the area of the projection of the laser beam 126 onto the component 20. In a particular example, the laser 26 operates at power range between about 75 to 105 W over the area of the projection of a laser beam 126 onto the component 20. In one example, the laser 26 operates at a scan speed of between about 2000 and 2500 mm/second (78.74 and 98.43 in/second). In a particular example, the laser 26 operates at a scan speed of between about 1425 and 1575 mm/second (56.10 and 62.00 in/second).

In one example, the ratio of the laser 26 power density in step 206 to the ratio of the power density in step 208 is less than about 3. More particularly, the ratio is between about 2.67 and 2.19.

Figure 5:
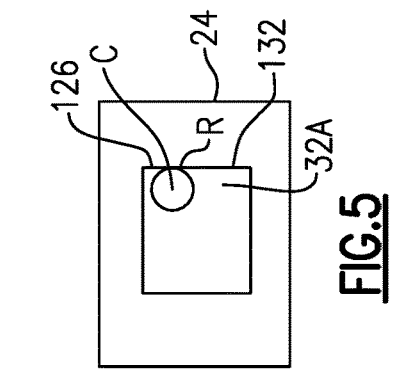
FIG. 5 schematically illustrates a top-down view of FIG. 4.

Referring to FIG. 5, the laser 26 produces a beam 126 with a center point C and a radius R. In some examples, the radius R is between about 25 and 50 µm (0.98 and 1.97 mils). The beam 126 corresponds to a "melt pool" of material on the component 20. In some examples, the melt pool has a radius of between about 30 and 40 µm (1.18 and 1.57 mils).

The center point C of the laser beam 126 is offset from a nominal edge 132 of component 20. Like the hatch distance H, an offset is selected to prevent overheating and/or distortion of material sintered during step 206 above, while also providing some small amount of overlap of sintered material to minimize voids in the perimeter of the layer 32A. In one example, the beam 126 is also offset so as not to overhang the edge 132. This maintains the desired shape of the component 20. In one example, the center point C is offset during step 206 to provide a linear offset of between about −150 and +150 µm (−5.91 to +5.91 mils). In a particular example, the linear offset is between about −80 and −100 µm (−3.15 and −3.94 mil). In another example, the linear offset is related to the size of a melt pool created by the beam 126.

For instance, the linear offset is between about 40% and 60% of a diameter of the melt pool.

In some examples, the center point C is offset during the contour scanning of step 208 in two dimensions. First, the "outline offset" shifts the center point C with respect to the nominal edge 132. A negative outline offset shifts the outer contour of the component 20 towards a center point of layer 32A and a positive offset shifts the outer contour of the component 20 away from a center point of layer 32A. In one example, the outline offset is related to the size of the melt pool created by the beam 126. For example, the outline offset is between about 40% and 60% of a diameter of the melt pool. In another example, the outline offset is between about −150 and +150 µm (−5.91 to +5.91 mils) from the nominal edge 132 of component 20. In a particular example, the outline offset is between about −50 and −70 µm (−1.97 and −2.76 mil).

In a further example, the outline offset is less than the liner offset discussed above. The center point C of the laser beam 126 also has a "heart offset" which is related to the mathematical edge of the contour of component 20. The heart offset value refers to the laser beam position 126 to compensate for the edge of the beam 126 at the edge 132 of the component 20, which is as close as possible to the nominal dimension of the component 20 as determined by the software program discussed above. In one example, the heart offset is between about 150 and +150 µm. In a particular example, the heart offset is between about −80 and −100 µm (−3.15 and −3.94 mil).

In step 210, the platform 24 is lowered and a second layer 32B of material is deposited onto the first layer 32A from the material source 28. The second layer 40 is compacted in step 212 by between 0 and 50% of the thickness T2 to form a layer 40 having thickness T2', as shown in FIG. 4. In a particular example, the compaction step 212 compacts the second layer 40 by between about 30 and 40%. In one example, the thickness T2' is less than the initial down thickness T1'. The thickness T2' of the second layer 32B is between about 20 and 40 µm (0.79 and 1.57 mil). In a particular example, the thickness T2' is between about 25 and 35 µm (0.98 and 1.38 mil). In another particular example, the thickness T2' is between about 40 and 60% of the thickness T1'.

In step 214, the software program directs the laser along the digital raster lines to sinter (or melt) the powdered material into a unitary solid layer 32B, shown in FIG. 4, as in step 206.

In step 216, the second layer 32B is contour scanned as in step 208. Steps 210, 212, and 214, and 216 are then repeated until the component 20 has the desired shape.

Table 2 below shows the relationship between laser power (P), scan speed (V), layer 32A, 32B thickness (T), compaction percentage of the powdered material, and hatch distance (H). Each column shows the effect on the other variables where one variable is increased. For instance, looking to the first column, an increased P corresponds to increased V, T, and H and decreased compaction percentage.

TABLE 2

|   | Increased P | Increased V | Increased T | Increased Compaction % | Increased H |
|---|---|---|---|---|---|
| P |   | + | + | − | + |
| V | + |   | − | + | − |
| T | + | − |   | + | − |

TABLE 2-continued

|  | Increased P | Increased V | Increased T | Increased Compaction % | Increased H |
|---|---|---|---|---|---|
| Compaction | − | + | + |  | + |
| H | + | − | − | + |  |

Referring back to FIG. 3A, in step 106, a heat treatment is performed on the component 20 after it is formed. The heat treatment further solidifies the component 20. In one example, heat treatment is performed in a hot isostatic press ("HIP") and can include solutionizing heat treatment. The heat treatment can be performed in a single cycle, minimizing the time the component 20 is held at a high temperature, which in turn translates to finer grain size in the component 20 microstructure and improved fatigue properties. Because the heat treatment can be performed in a single cycle, manufacturing time and cost is reduced.

Typically with nickel alloy components, there is a tradeoff between fatigue and creep resistance. The process parameters described above (including the laser 26 power and scan speed, the layer 32A, 32B thickness T1' and T2', the hatch distance H, and the outline and heart offsets) produce a component 20 with improved fatigue and creep resistance. Fatigue and creep resistance are related to the microstructure of the component 20. The component 20 formed as discussed above has high density, greater than approximately 99, and in one example, approximately 99.8%, and minimized porosity which contributes to its improved fatigue and creep resistance. The component 20 has a grain morphology with generally uniform grain size, between about 40 μm and 60 μm average grain size between 40 and 60 μm (1.57 and 2.36 mils), and generally close to equiaxed grain shapes, which also contributes to its improved homogeneity and Young modulus. Furthermore, the microstructure of component 20 can be obtained in both thick and thin areas of component 20 with the method described above. That is, minimal or no process changes are needed to obtain high fatigue and creep resistance over the entire component 20, irrespective of its shape, meaning manufacturing costs and time are lowered.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of making a component, comprising:
   providing a digital model of a component to a software program, the software program operable to slice the digital model into digital layers and raster each digital layer into digital segments, the digital segments delineated by digital raster lines;
   depositing a first layer of powdered material onto a platform;
   compacting the first layer of powered material into a first compacted layer;
   sintering the first compacted layer along lines corresponding to the digital raster lines using a laser that produces a laser beam, wherein the laser operates at a first power and a first scan speed, and wherein the laser beam has a radius between about 25 and 40 microns (0.98 and 1.57 mils) during the sintering of the first compacted layer along lines corresponding to the digital raster lines; and
   sintering the first compacted layer along a perimeter of the first compacted layer using the laser to form a first unitary layer, wherein the laser operates at a second power and a second scan speed, wherein the ratio of the first power to the second power is less than about 3 and the first scan speed is faster than the second scan speed; wherein the laser beam has a radius between about 25 and 50 microns (0.98 and 1.97 mils) during the sintering of the first compacted layer along the perimeter.

2. The method of claim 1, wherein, the first power is between about 200 and 230 W.

3. The method of claim 1, wherein the second power is between about 75 and 105 W.

4. The method of claim 1, wherein the first layer of powdered material has a first thickness after the depositing step, and wherein the compacting step compacts the first layer of powdered material to a second thickness that is by between about 40% and 60% of the first thickness.

5. The method of claim 4, wherein the second thickness is between about 20 and 40 μm (0.79 and 1.57 mil).

6. The method of claim 1, wherein the compaction step results in a packed density of the first layer of powdered material of between about 4 and 6 g/cc.

7. The method of claim 1, wherein a distance between the raster lines is between about 30 μm and 100 μm (1.18 and 3.94 mils).

8. The method of claim 1, wherein a center point of the laser beam is offset from an edge of the first unitary layer during the step of sintering the first compacted layer along a perimeter of the first compacted layer such that the beam does not overhang the edge of the first unitary layer.

9. The method of claim 8, wherein the offset includes an outline offset of between about −150 and +150 μm (−5.91 to +5.91 mils) and a Heart offset of between about −150 and +150 μm (−5.91 to +5.91 mils).

10. The method of claim 1, wherein a controller is operable to receive signals from the software program and direct the laser during the step of sintering the first compacted layer along lines corresponding to the digital raster lines and the step of sintering the first compacted layer along a perimeter of the first compacted layer.

11. The method of claim 1, further comprising:
    depositing a second layer of powdered material onto the first unitary layer;
    compacting the second layer of powdered material into a second compacted layer;
    sintering the second compacted layer along lines corresponding to the digital raster lines using a laser, wherein the laser operates at the first power and the first scan speed; and
    sintering the second compacted layer along a perimeter of the second compacted layer using the laser to form a second unitary layer, wherein the laser operates at the second power and the second scan speed.

12. The method of claim 11, further comprising heat treating the first unitary layer and second unitary layer, wherein the heat treatment is performed in a hot isostatic press.

13. The method of claim 12, wherein the first unitary layer has an average grain size of between about 40 and 60 μm (1.57 and 2.36 mils) after the heat treatment.

14. The method of claim 13, wherein the first unitary layer has equiaxed grain shapes.

15. The method of claim 12, wherein the first unitary layer has an average density of greater than about 99% after the heat treatment.

16. The method of claim 11, wherein the second layer of powdered material has a first thickness after the depositing step, and wherein the compacting step compacts the second layer of powdered material to a second thickness, and the second thickness is between about 20 and 40 μm (0.79 and 1.57 mil).

17. The method of claim 11, wherein the thickness of the second compacted layer is between about 40 and 60% of the thickness of the first compacted layer.

18. The method of claim 11, wherein the laser has a beam, and a center point of the beam is offset from an edge of the second unitary layer during the fourth sintering step such that the beam does not overhang the edge of the second unitary layer.

19. The method of claim 1, wherein the material is a powered nickel alloy, and wherein the component is a heat exchanger is operable at temperatures greater than 1600° F. (871° C.).

20. An apparatus for making a component, comprising:
a controller operable to receive signals from a software program, the software program operable to slice a digital model of a component into digital layers and raster each digital layer into digital segments, the digital segments delineated by digital raster lines;
a material source operable to provide material to a platform;
a compactor operable to compact the material; and
a laser operable to sinter the material by a laser beam, the laser movable by the controller to sinter the material along the raster lines at a first power and a first speed and along a perimeter of the component at a second power and a second scan speed, wherein the ratio of the first power to the second power is less than about 3 and the first scan speed is faster than the second scan speed, and wherein the beam has a radius between about 25 and 40 microns (0.98 and 1.57 mils) when sintering along the raster lines and a radius between about 25 and 50 microns (0.98 and 1.57 mils) when sintering along the perimeter.

* * * * *